(12) United States Patent
Zaykov et al.

(10) Patent No.: US 11,409,643 B2
(45) Date of Patent: Aug. 9, 2022

(54) SYSTEMS AND METHODS FOR SIMULATING WORST-CASE CONTENTION TO DETERMINE WORST-CASE EXECUTION TIME OF APPLICATIONS EXECUTED ON A PROCESSOR

(71) Applicant: Honeywell International Inc., Morris Plains, NJ (US)

(72) Inventors: Pavel Zaykov, Brno (CZ); Larry James Miller, Black Canyon City, AZ (US); Srivatsan Varadarajan, St. Louis Park, MN (US)

(73) Assignee: Honeywell International Inc, Charlotte, NC (US)

( * ) Notice: Subject to any disclaimer, the term of this patent is extended or adjusted under 35 U.S.C. 154(b) by 357 days.

(21) Appl. No.: 16/794,885

(22) Filed: Feb. 19, 2020

(65) Prior Publication Data

US 2021/0133088 A1 May 6, 2021

Related U.S. Application Data

(60) Provisional application No. 62/931,548, filed on Nov. 6, 2019.

(51) Int. Cl.
*G06F 11/00* (2006.01)
*G06F 11/36* (2006.01)
*G06F 13/16* (2006.01)
*G06F 12/084* (2016.01)

(52) U.S. Cl.
CPC ........ *G06F 11/3688* (2013.01); *G06F 12/084* (2013.01); *G06F 13/1668* (2013.01); *G06F 2212/622* (2013.01)

(58) Field of Classification Search
CPC ............ G06F 11/3688; G06F 11/3017; G06F 11/3409; G06F 11/3485; G06F 11/3612; G06F 11/3664; G06F 11/3668
See application file for complete search history.

(56) References Cited

U.S. PATENT DOCUMENTS

| | | | |
|---|---|---|---|
| 5,586,293 | A | 12/1996 | Baron et al. |
| 6,016,531 | A | 1/2000 | Rixner et al. |
| 6,161,166 | A | 12/2000 | Doing et al. |
| 6,182,194 | B1 | 1/2001 | Uemura et al. |

(Continued)

FOREIGN PATENT DOCUMENTS

| | | |
|---|---|---|
| CN | 103544065 A | 1/2014 |
| CN | 103544065 B | 2/2017 |

(Continued)

OTHER PUBLICATIONS

Chu et al., "An Instruction Cache Architecture for Parallel Execution of Java Threads", The Fourth International Conference on Parallel and Distributed Computing, Applications and Technologies, Aug. 2003, pp. 180-187, Chengdu, China.

(Continued)

*Primary Examiner* — Amine Riad
(74) *Attorney, Agent, or Firm* — Fogg & Powers LLC

(57) ABSTRACT

Techniques for determining worst-case execution time for at least one application under test are disclosed using memory thrashing. Memory thrashing simulates shared resource interference. Memory that is thrashed includes mapped memory, and optionally shared cache memory.

20 Claims, 8 Drawing Sheets

(56) References Cited

U.S. PATENT DOCUMENTS

| | | | |
|---|---|---|---|
| 6,272,599 B1* | 8/2001 | Prasanna | G06F 12/0888 |
| | | | 711/138 |
| 6,317,874 B1* | 11/2001 | Prasanna | G06F 8/4442 |
| | | | 717/165 |
| 6,397,301 B1 | 5/2002 | Quach et al. | |
| 6,574,682 B1 | 6/2003 | Chan | |
| 7,302,685 B2 | 11/2007 | Binns et al. | |
| 8,069,308 B2 | 11/2011 | Larson et al. | |
| 8,694,747 B2 | 4/2014 | Jegu et al. | |
| 8,943,287 B1 | 1/2015 | Miller et al. | |
| 9,275,002 B2 | 3/2016 | Manet et al. | |
| 9,465,664 B1 | 10/2016 | Miller | |
| 9,639,401 B1 | 5/2017 | Bertram et al. | |
| 9,703,690 B2 | 7/2017 | Fulton et al. | |
| 10,210,117 B2 | 2/2019 | Gittins | |
| 10,552,215 B1* | 2/2020 | Xu | G06F 9/526 |
| 10,664,325 B1* | 5/2020 | Radack | G06F 9/4881 |
| 2003/0088606 A1 | 5/2003 | Miller et al. | |
| 2003/0101084 A1 | 5/2003 | Otero Perez | |
| 2005/0144401 A1 | 6/2005 | Pantalone et al. | |
| 2005/0312141 | 6/2005 | Sturges et al. | |
| 2005/0235124 A1 | 10/2005 | Pomaranski et al. | |
| 2006/0184741 A1 | 8/2006 | Hrusecky et al. | |
| 2007/0083728 A1 | 4/2007 | Nijhawan et al. | |
| 2007/0168642 A1 | 7/2007 | Wilson | |
| 2008/0140937 A1 | 6/2008 | Nalawade et al. | |
| 2008/0235658 A1* | 9/2008 | Adi | G06F 8/20 |
| | | | 717/108 |
| 2008/0285652 A1 | 11/2008 | Oxman et al. | |
| 2009/0217280 A1 | 8/2009 | Miller et al. | |
| 2009/0300631 A1 | 12/2009 | Karlapalem et al. | |
| 2010/0199280 A1* | 8/2010 | Vestal | G06F 9/52 |
| | | | 713/320 |
| 2012/0192195 A1* | 7/2012 | El-Moursy | G06F 9/4893 |
| | | | 718/103 |
| 2013/0166271 A1 | 6/2013 | Danielsson et al. | |
| 2013/0205301 A1* | 8/2013 | Easwaran | G06F 9/4881 |
| | | | 718/104 |
| 2014/0122848 A1* | 5/2014 | Easwaran | G06F 9/4887 |
| | | | 712/E9.016 |
| 2015/0205724 A1 | 7/2015 | Hancock et al. | |
| 2016/0034314 A1* | 2/2016 | Xu | G06F 9/4887 |
| | | | 718/103 |
| 2016/0154753 A1* | 6/2016 | Gittins | G06F 13/20 |
| | | | 710/117 |
| 2016/0247081 A1* | 8/2016 | Zaykov | G06N 5/048 |
| 2016/0275015 A1 | 9/2016 | Gittins | |
| 2016/0283272 A1 | 9/2016 | Coleman | |
| 2016/0364267 A1 | 12/2016 | Varadarajan et al. | |
| 2017/0083465 A1* | 3/2017 | Jan | G06F 3/0647 |
| 2018/0068134 A1* | 3/2018 | Schwarz | G06F 21/74 |
| 2018/0173622 A1 | 6/2018 | Fruechtenicht et al. | |
| 2019/0107415 A1* | 4/2019 | Fumey | G06F 11/3013 |
| 2019/0205177 A1 | 7/2019 | Le Rhun et al. | |
| 2019/0294472 A1 | 9/2019 | Varadarajan et al. | |
| 2019/0294546 A1 | 9/2019 | Agarwal et al. | |
| 2019/0340140 A1* | 11/2019 | Sozzi | G06F 13/372 |
| 2020/0034130 A1* | 1/2020 | Fumey | G06F 9/3877 |
| 2021/0064506 A1* | 3/2021 | Calmon | G06F 11/3452 |
| 2021/0109796 A1* | 4/2021 | Fozard | G06F 9/4881 |

FOREIGN PATENT DOCUMENTS

| | | |
|---|---|---|
| EP | 0529217 A1 | 3/1993 |
| EP | 1111511 A1 | 6/2001 |
| EP | 1182567 A1 | 2/2002 |
| GB | 2284911 A | 6/1995 |
| KR | 101788279 B1 | 10/2017 |

OTHER PUBLICATIONS

DDC-I, "Deos, a Time & Space Partitioned, Multi-core Enabled, DO-178C DAL A Certifiable RTOS", DDC-I Safety Critical Software Solutions for Mission Critical Systems, at least as early as Oct. 18, 2019, pp. 1-3.

European Patent Office, "Extended European Search Report from EP Application No. 09151992.6", from Foreign Counterpart to U.S. Appl. No. 12/030,635, dated Jul. 20, 2009, pp. 1-9, Published: EP.

European Patent Office, "Extended European Search Report from EP Application No. 19164199.2", from Foreign Counterpart to U.S. Appl. No. 15/928,656, dated Jul. 18, 2019, pp. 1-9, Published: EP.

Hardy et al., "Using Bypass to Tighten WCET Estimates for Multi-Core Processors with Shared Instruction Caches", 2009 30th IEEE Real-Time Systems Symposium, Published 2009 IEEE, pp. 68-77.

Jerabek et al., "Static Worst-Case Execution Time Analysis Tool Development for Embedded Systems Software", DEPEND 2016 : The Ninth International Conference on Dependability, Copyright IARIA, 2016, pp. 7-14.

Kumar et al., "Compiling for Instruction Cache Performance on a Multithreaded Architecture", In Proceedings of the 35th International Symposium on Microarchitecture, Nov. 2002, pp. 1-11.

Rose, "Memory Partitioning and Slack Scheduling Boost Performance in Safety-Critical Applications", Embedded Revolution, Aug. 26, 2014, pp. 1-17, Electronic Design.

* cited by examiner

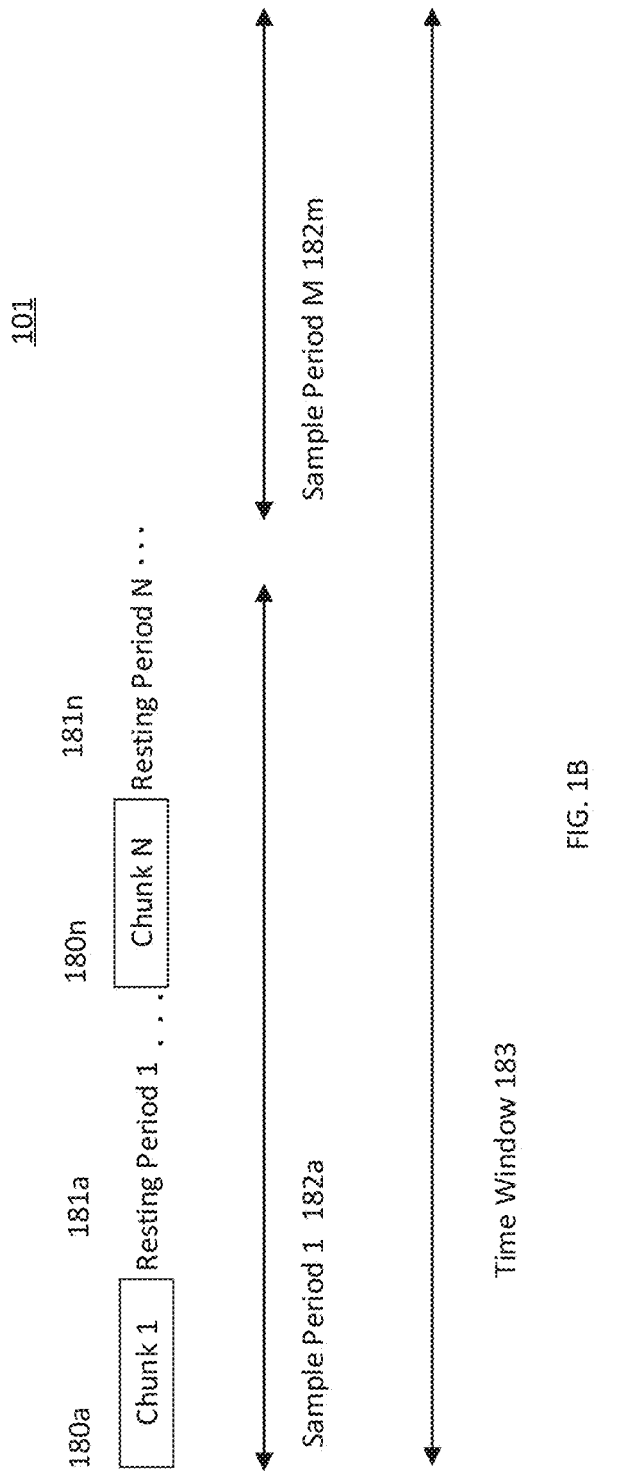

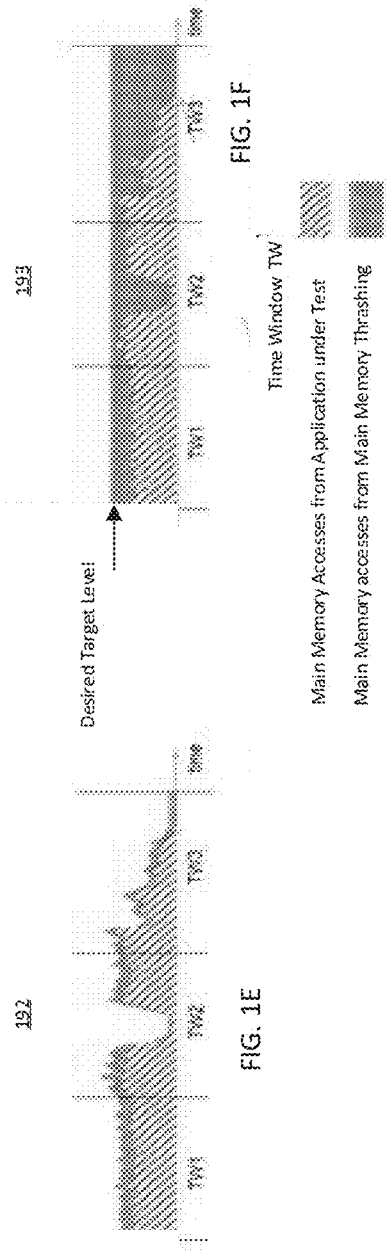

SYSTEMS AND METHODS FOR SIMULATING WORST-CASE CONTENTION TO DETERMINE WORST-CASE EXECUTION TIME OF APPLICATIONS EXECUTED ON A PROCESSOR

CROSS-REFERENCE TO RELATED APPLICATIONS

The present application claims benefit of U.S. Patent Application Ser. No. 62/931,548, filed Nov. 6, 2019; the entire contents of the aforementioned patent application are incorporated herein by reference as if set forth in its entirety.

BACKGROUND

Modern systems utilize software applications (applications) executed on Real-Time Operating Systems (RTOSs) and processing systems. Such systems may comply with the Aeronautical Radio, Incorporated (ARINC) 653 standard or other paradigms, which include application partitions. An application may comprise one or more partitions. Partitioning is a technique to provide necessary separation and independence of functions for applications to ensure that only intended coupling occurs between applications. Each application partition may comprise one or more processes, where a process may otherwise be referred to as a task or a thread and the processes are scheduled according to the RTOS scheduling paradigm. Processes within each partition are executed on the processing system during a time window.

The processing systems may be single or multicore processing systems. The multicore processing system means a computer including a multicore processor, e.g., a multicore microprocessor or digital signal processor, having two or more physical and/or virtual cores. Examples of multicore processors include multicore ARM advanced RISC machine, IBM PowerPC, and Intel and Advanced Micro Devices X86 processors. Alternatively, multicore processors can be implemented in field programmable gate arrays (FPGAs), e.g., such as those manufactured by Xilinx. Some multicore processors have multiple types of cores. A single core processing system means a computer including a single physical core processor and no virtual core.

Each core typically includes a processor and often includes cache memory (e.g., L1 cache) dedicated to the processor. The multicore processors (and/or multicore processing systems) also comprise shared resources. Shared resources include interconnects (fabrics), shared cache memory (located inside and/or outside of the core, e.g., L1 cache, L2 cache and/or L3 cache), memory controllers, data bus(es), and main memory which are utilized by each core in the multicore processing system. Shared cache memory is shared by two or more cores, i.e., physical and/or virtual cores. Shared cache memory may be mapped to portions of main memory. Main memory, for example, may be implemented with dynamic random-access memory (DRAM). The interconnects couple each core to other internal and external components of the multiprocessor, e.g., main memory.

Because each core uses the same shared resources, an application's process(es) executed on one core can detrimentally increase execution time of another application's process(es) executing in parallel on another core. Examples of shared resource accesses are reading from the main memory and writing to the main memory; in some cases, data read from or written to main memory may automatically changes content of shared cache memory. For example, because cores of a multicore processor utilize shared resources, an application's process execution time on one core can increase, e.g., by a factor of three times, due to interference arising from use of shared resources during parallel execution of other application's process(es) running on other core(s). Interference means contention for shared resources due to other application(s)' use of shared resources that are also used by the application under test. One application's reading from and/or writing to the main memory, and thus possibly also accessing shared cache memory, can have a detrimental effect on execution time of another application.

In safety critical systems, applications are often allocated finite time periods (i.e., time windows) to complete execution. The allocated time period for application execution is typically configured to be greater than or equal to the application's worst-case execution time (WCET). Thus, sufficient, but not excessive, time can be allocated to each application to complete execution. The WCET means a maximum amount of time that an application requires to complete execution. WCET determination for a single core processor can be challenging, e.g., due to the impact of direct memory access circuitry. The WCET of an application executed on a multicore processor is more difficult to determine, and almost always exceeds WCET for the same application executed on a single-core processor; this is due to interference from other application(s) executed on other core(s) accessing shared resources.

Determination of a WCET for an application executed on a multicore processor is more difficult because it is difficult to determine potential interference channels to an application arising from other application(s)' use of shared resources. In safety critical systems, there are often partitioning requirements that mandate each application to operate correctly and meet its timing deadlines regardless of the behavior of any other application hosted (and possibly executed) on the same multicore processor. Thus, each application's WCET must account for delays arising from behavior(s) of other applications potentially executed in parallel on the same multicore processor, when the other applications operate as designed or even erroneously.

Simulating shared resource contention during WCET testing of a user application (i.e., an application under test) executed on a multicore processor may be performed by executing one or more special thrashing applications in a test configuration on the same or other (unused) cores of the multicore processor. Such thrashing applications are software executed on the same or unused cores to simulate other application(s)' use of shared resources. This method has major drawbacks. One drawback is that the method is intrusive where the actual software configuration must be changed to a test configuration to accommodate special thrashing applications and some applications may need to be removed. This can present challenges since the application under test may have dependencies on one or more of the applications removed to make room for the thrashers.

SUMMARY

A system for stimulating contention contributing to worst-case execution time of each of one or more applications under test is provided. The system comprises: processor circuitry comprising N processor cores circuitry, where N is greater than or equal to one; wherein one or more of the N processor cores circuitry of the processor circuitry are configured to execute the one or more applications under test; one or more thrashing circuits communicatively coupled to the processor circuitry and configured to perform mapped memory thrashing to simulate the contention; shared cache memory circuitry communicatively coupled to the processor circuitry; and mapped memory circuitry communicatively coupled to the processor circuitry, the one or more thrashing circuits, and the shared cache memory circuitry.

DRAWINGS

Understanding that the drawings depict only exemplary embodiments and are not therefore to be considered limiting in scope, the exemplary embodiments will be described with additional specificity and detail using the accompanying drawings, in which:

FIG. 1B illustrates a diagram of one embodiment illustrating bursts, resting periods, and sample periods;

FIG. 1E illustrates a diagram of one embodiment of adding a fixed rate of main memory thrashing for coarse grained adjustment;

FIG. 1F illustrates a diagram one embodiment of using feedback to attain the desired target level;

Figure 1A:
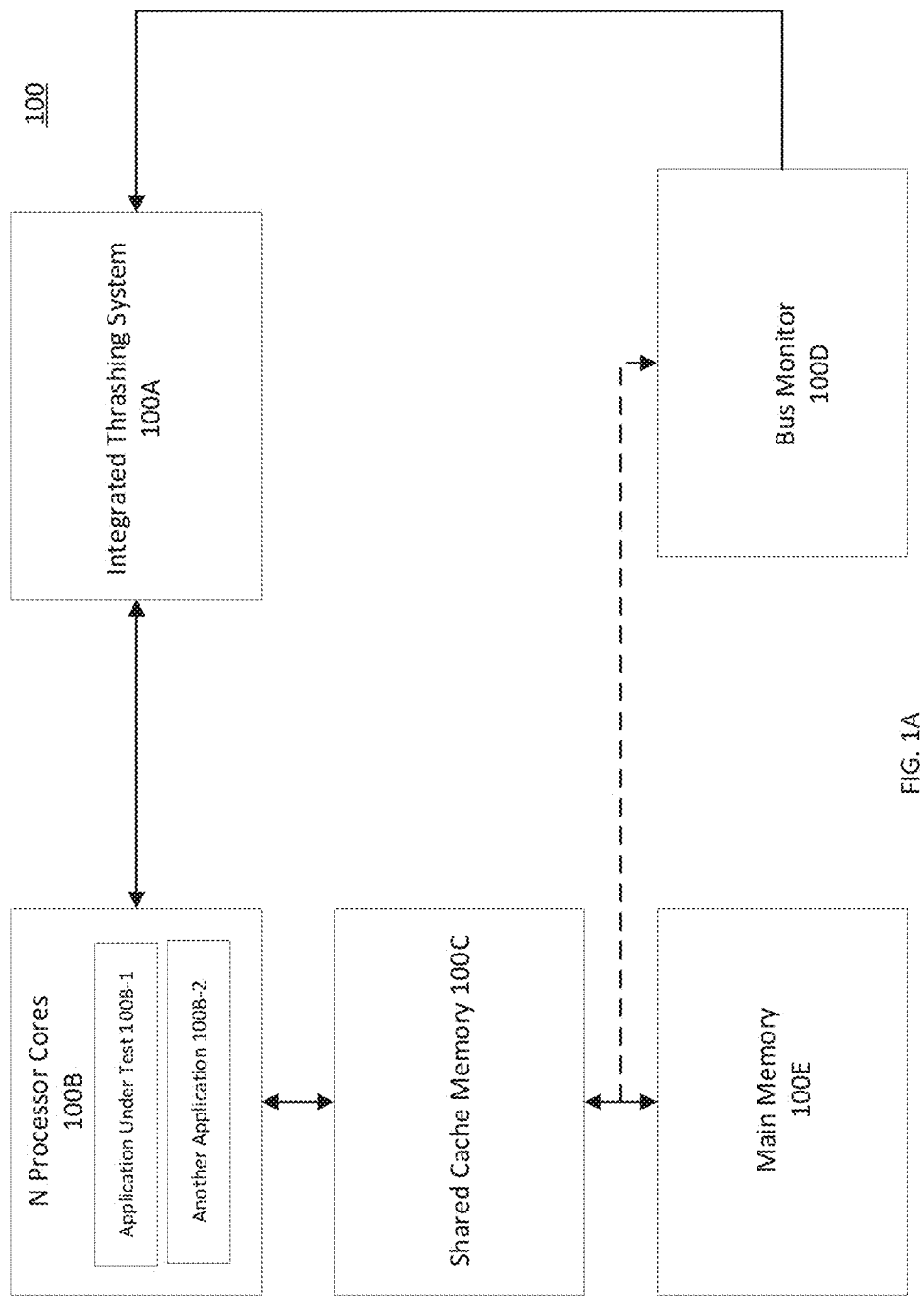
FIG. 1A illustrates a block diagram of one embodiment of a multicore processing system having an integrated thrashing system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the invention are applicable to single and multi-core processors, and to processing systems with hypervisors. Processors may also be referred to herein as processor circuitry. For pedagogical purposes, the invention will be illustrated as being implemented in a multi-core processor; however, the invention is not limited to multi-core processors.

To stimulate worst-case contention conditions to accurately determine WCET for an application executed on a single or multicore processor, one or more thrashing systems (or circuits) are communicatively coupled to a corresponding processing system including the processor. For pedagogical purposes, embodiments of the invention are exemplified herein with a single thrashing circuit. However, embodiments of the invention may utilize one or more thrashing circuits.

Thrashing simulates interference channels (e.g., shared cache and memory) between the application(s) under test and other systems or applications (e.g., other application(s) executed by the processor, and/or other systems and/or application(s) utilizing mapped memory). Mapped memory can be DRAM on the target module but could also be any memory mapped resource accessible to the thrasher such as memory on a different module accessible over a PCIe bus. Techniques to accurately determine WCET with a thrashing system will be subsequently described. By accurately determining WCET, time windows can be accurately determined—without having to include excess time in time windows that are not needed for application execution. Processing system may also be referred to herein as processing circuitry.

A thrashing system can provide a user or system defined level of memory transaction interference and optionally pollute shared cache memory to more accurately determine WCET of application partitions executing on one or more multiprocessor cores. Processor cores may also be referred to herein as processor cores circuitry. Memory, e.g. shared cache memory and/or main memory, may also be referred to herein as memory circuitry. Embodiments of the invention facilitate performing WCET evaluation in a non-intrusive manner thereby allowing testing of the original software configuration. Thus, multiple special test configurations required for multiple user applications are avoided. Additionally, the WCET of multiple concurrently executing application partitions can be determined simultaneously.

Optionally, the thrashing system can affect attributes of communication media, e.g., bus(es) and/or network controller(s), used to convey read and write commands to affect the rates of transactions (reads from and/or writes to mapped memory). Attributes may include, for example, length and/or size of transactions, and/or an indication whether or not a mapped memory transaction is to be stored in cache memory. Thus, the thrashing system can affect the transaction rate of mapped memory with such attributes in addition to issuing reads from and/or writes to mapped memory and/or shared cache memory.

Main memory stores program instructions and data to be executed by processor circuitry. Cache memory stores program instructions and data temporarily and so that they can be quickly retrieved.

Application under test means the application whose WCET is being determined. The application(s) under test (i.e., or one or more applications under test) may be executed on one or more cores of a processor. The other application(s) may each be executed on one or more cores of the processor.

In some hardware configurations, the hardware thrashing system may perform in parallel both shared cache memory thrashing and mapped memory (e.g., DRAM and/or SRAM) thrashing by generating memory transactions that evict and/or allocate cache lines into the shared cache memory of the single or multi-core processor. A cache line is a block of memory transferred between shared cache memory and main memory. Cache line eviction means moving data of cache line(s) out of shared cache memory and into main memory. Cache line allocation means allocating cache line(s), in shared cache memory, for new data.

The cache thrasher may be implemented in software rather than hardware. If a separate software cache thrasher is used with a hardware thrashing system, then the software cache thrasher may operate in parallel or sequentially. Software cache thrasher means a cache thrasher implemented in software which is configured to perform software cache thrashing, and is configured to be executed by a core of the multiprocessor which is the same core as, and/or different core(s) than, the core(s) executing the application(s) under test. Optionally, the software cache thrasher may be stored in main memory.

A thrashing system can trigger cache line allocations and/or cache line evictions that impact the application(s) under test's execution time in the same way that another application executing on a different core would impact shared cache memory. When this capability is available, the thrashing system can provide thrashing of all sets of data within a shared cache memory by addressing a sufficiently broad range of memory addresses. Alternatively, the thrashing system may perform selective shared cache thrashing; selective shared cache thrashing means thrashing only selected sets of data within shared cache memory by thrashing only memory addresses associated with the selected sets of data within shared cache memory. This selective shared cache thrashing strategy is particularly useful in systems utilizing cache partitioning because specific sets of data within a shared cache memory (such as those shared between application partitions) may be targeted for thrashing while those cache sets unique to each application partition can be excluded. Cache partitioning means segregating portions of shared cache memory where each portion is used by a unique application and/or is shared by two or more different applications. The amount of shared cache thrashing is determined by the amount of main memory, specified to be thrashed, that is mapped to shared cache memory.

Mapped memory thrashing means system generating mapped memory transactions that interfere with, e.g., delay, mapped memory transactions commanded by the application(s) under test. The delays can be caused by memory controller contention, bus congestion, and/or fabric congestion. Mapped memory transactions may be reading from and/or writing to mapped memory. Mapped memory may also be referred to herein as mapped memory circuitry. Mapped memory means any mapped address space, e.g., main memory, mapped memory address space coupled to a processing system (or processing system circuitry) by interconnection circuitry (e.g., a Peripheral Component Interconnect Express (PCIe) bus, a serial advanced attachment (SATA) bus, an inter-integrated circuit ($I^2C$) bus, RapidIO fabric, Ethernet network, and/or any other type of bus, and/or any other type of interconnection circuitry). The mapped memory may be in programmable gate array circuitry, co-processor circuitry, memory circuitry, and/or any other type of mapped memory circuitry.

The thrashing system may perform mapped memory thrashing only, or mapped memory thrashing and shared cache thrashing. When both shared cache thrashing and mapped memory thrashing are performed, cache thrashing and mapped memory thrashing may be performed in parallel (i.e., at the same time) or sequentially. When performed in parallel, the shared cache thrashing and the mapped memory thrashing are also performed in parallel with execution of one or more applications under test.

When performed sequentially, shared cache thrashing is performed prior to execution of the application(s) under test. Mapped memory thrashing is performed in parallel with execution of one or more applications under test. Optionally, shared cache thrashing, application(s) under test execution, and mapped memory thrashing may be periodically performed to obtain statistical information about execution time, e.g. WCET, average-case execution time, and best-case execution time.

Shared cache thrashing is affected by reading and/or writing to portions of mapped memory that are temporarily stored to shared cache memory. Shared cache thrashing means evicting useful instructions or data from a cache and/or creating "dirty" (not written back to mapped memory) content in one or more portions of the shared cache memory shared by the application (whose WCET is being evaluated; hereinafter the "application under test") and at least one other application. Cache interference between applications can occur when the applications are hosted on the same core or on different cores. However, such cache interference is more problematic when applications sharing cache memory are executed in parallel by different cores of a multicore processor. In this case, shared cache thrashing can be continuous, and it is thus more impactful. Shared portion(s) of the cache memory may be utilized by applications, e.g., for access to cacheable addresses for code execution, data stacks, and data heaps, and when interacting with an operating system kernel. Shared cache thrashing results in useful data and/or instructions, for the application(s) under test, being evicted from the shared portions of the shared cache memory when they are needed by the application(s) under test. This forces the application(s) under test to re-load the evicted addresses into the shared cache memory, resulting in longer execution time. When thrashing fills the shared cache memory with dirty data during cache line allocation, the application(s) under test encounters even longer execution times since the dirty data must be written to mapped memory by the processor before the application(s) under test's data may be placed into the shared cache memory. As a result, the multicore processor performs more frequent read and/or write accesses from/to portion(s) of mapped memory mapped to shared cache memory because of the cache pollution. The increased frequency of accesses to mapped memory increases the WCET of the application(s) under test.

The thrashing system may be embedded in the multicore processor or may be physically implemented external to the multicore processor. In either case, the thrashing system must be communicatively coupled to at least the main memory.

The thrashing system may be embedded in a multicore processor by integrating an instantiation of the thrashing system design in the multicore processor; integrated means forming on one substrate. Thus, an integrated thrashing system means a thrashing system (or thrashing circuit) embedded in a multicore processor by integrating an instantiation of the thrashing system design in the multicore processor. One or more thrashing circuits can be embedded in a multicore processor. For example, the thrashing system design may be integrated by instantiating a specific intellectual property (IP) core as a fixed hardware unit in the multicore processor, or by a soft IP core formed by programming a gate array, e.g., a field programmable gate array (FPGA), that is part of the multicore processor. The thrashing system can also be implemented in software executed in a generic processing core, e.g., instantiated in the FPGA. The integrated thrashing system can provide mapped memory and/or cache interference equivalent to one or more user applications running on one or more processor cores.

The capabilities of an integrated thrashing system to disrupt, or thrash, shared cache memory will depend on how the integrated thrashing system is coupled to the processing cores. For example, if it is coupled to the mapped memory, e.g., main memory, and has no means to snoop the shared cache memory, the integrated thrashing system can only perform mapped memory thrashing. If, however, the integrated thrashing system, can snoop the shared cache memory, but not allocate new lines into the shared cache memory, then it can prompt the eviction of useful data from the shared cache memory. If alternatively, it has full access to the shared cache memory, then the integrated thrashing system can both prompt the eviction of useful data from and allocate data into the shared cache memory, simulating 'dirty' data in the shared cache memory.

If it can thrash the shared cache memory, the integrated thrashing system can simulate shared resource contention to permit accurate determination of WCET of the application(s) under test without using an additional multi-core processor or at least one core of the multicore processor to perform thrashing of shared cache memory. The thrashing system is configured to thrash portions, of both mapped memory and/or shared cache memory, used by the application(s) under test, one or more other applications, and/or other hardware devices such as direct memory access (DMA) circuitry. Thus, for example, for a single core processor, a thrashing system may be used to simulate interference to mapped memory and/or shared cache memory from DMA circuitry.

FIG. 1A illustrates a block diagram of one embodiment of a multicore processing system having an integrated thrashing system (multicore processing and integrated thrashing system) 100. The multicore processing and integrated thrashing system 100 includes an integrated thrashing system (or integrated thrashing circuit) 100A, N processor cores (where N is greater than 1) 100B, shared cache memory 100C, a bus monitor (or bus monitor circuitry) 100D, and main memory 100E. The bus monitor 100D is configured to measure reads from and/or writes to mapped memory, e.g., main memory 100E. Unique cores of the N processor cores 100B are configured to execute the application under test 100B-1 and another application 100B-2. The application under test 100B-1 and the other application 100B-2 may be stored in the shared cache memory 100C and/or the main memory 100E.

At least the integrated thrashing system 100A and the N processor cores 100B are integrated together (e.g., formed on a single integrated circuit), forming a multicore processor. The shared cache memory 100C and/or the bus monitor 100D may also be integrated, e.g., formed on a single integrated circuit, with the integrated thrashing system 100A and the N processor cores 100B; thus, the shared cache memory 100C and/or the bus monitor 100D may also be integrated with the multicore processor.

The multicore processor is communicatively coupled to the main memory 100E. For pedagogical purposes, for FIGS. 1-3, mapped memory is illustrated as main memory 100E. Mapped memory thrashing is generally illustrated herein as main memory thrashing. However, the techniques illustrated herein are equally applicable to any other type of mapped memory coupled to N processing cores by a bus, network, fabric, and/or any other communications circuitry. Thus, techniques for main memory thrashing are generally applicable to mapped memory thrashing.

The N processor cores 100B are communicatively coupled to the integrated thrashing system 100A, the main memory 100E, and the shared cache memory 100C. The bus monitor 100D is communicatively coupled to the integrated thrashing system 100A. The bus monitor 100D is communicatively coupled to the shared cache memory 100C and/or the main memory 100E. Optionally, the shared cached memory 100C and/or the main memory 100E are communicatively coupled through the bus monitor 100D to the N processor cores 100B; alternatively, though, the shared cache memory 100C and/or main memory 100E may each be coupled (but not through the bus monitor 100D) to the N processor cores 100B. Processor cores may also be referred to herein as processor cores circuitry.

The integrated thrashing system 100A is configured to receive configuration data, e.g., from main memory 100E through the N processor cores 100B; configuration data is described elsewhere herein. The integrated thrashing system 100A (and the subsequently described non-integrated thrashing system) may be configured to increase a rate of main memory thrashing by a fixed amount or by a variable amount within or over time periods, e.g., time windows. Thus, e.g., main memory thrashing may be performed during those time periods, e.g., time windows. A time window means a fixed or variable period of time across all cores of the N processor cores 100B, where a core executes one application or multiple applications, one or more of which could be the application(s) under test.

Fixed rate increase of main memory thrashing means increasing main memory reads and/or writes caused by the application(s) under test and the other applications by a fixed rate, e.g., of main memory reads per unit time and/or of main memory writes per unit time. The fixed rate increase, e.g., of main memory reads per unit time and/or of main memory writes per unit time, may be defined by a system or a user.

Variable rate increase of main memory thrashing means variably increasing, when necessary, the rate of main memory reads and/or writes above the rates resulting from the application(s) under test and the other application(s) by a variable rate, e.g., of main memory reads per unit time and/or of main memory writes per unit time, so that the total rate of reads of and/or writes to main memory is substantially constant over time, e.g., is within a threshold offset of a desired target average rate. The target average rate may be defined by a system or a user and may vary over time. To achieve a target average rate, the amount of main memory reads and/or writes must be measured and feedback, e.g. by the bus monitor 100D, to the integrated thrashing system 100A. Thus, the target average rate means a target rate of the sum of the rates of main memory reads and/or writes performed by main memory thrashing, by the application(s) under test, and by the other application(s). The integrated thrashing system 100A then determines the additional rate of reads of and/or writes to main memory 100E introduced to achieve the target average rate. The rates of the reads from and the writes to main memory 100E, generated by integrated thrashing system 100A, may be equal or may be unequal.

Both coarse and fine grain adjustment are utilized to dynamically adjust thrasher behavior. Both coarse and fine grain adjustment are utilized for variable rate thrashing while only fine grain adjustments are utilized for fixed rate thrashing. The target for each sampling period can vary with variable rate thrashing. However, the target is fixed for all sampling periods for fixed rate thrashing.

The main memory thrasher is provided with a specific target of reads from and/or writes to main memory per time (e.g., per microsecond) (to be performed by one or more cores and the main memory thrasher) to be achieved within a time window. To obtain its target rate by the end of the time window, the main memory thrasher receives measurements of the running transaction count occasionally (known as a sample period) so the thrasher output target during the next sample period can be adjusted up or down based on whether it is above or below the target transaction trajectory. This is known as coarse adjustment. Within each sample period, bursts of transactions (known as chunks) and resting periods alternate to achieve the desired quantity of transactions computed to be necessary within the sample period. A chunk period comprises a chunk and a corresponding resting period. Chunk means a period of time when reads from main memory, writes to main memory, or both are performed. Resting period means period of time when no main memory transactions are performed, or when main memory transactions (that are different than the main memory transactions performed during chunks) are performed. Resting periods are optional, e.g., if the main memory thrashing is unable meet its desired target average rate (described elsewhere herein). For example, during a chunk reads from main memory are performed and during the resting period writes to main memory are performed; however, writes to main memory may be performed during the chunk and reads from main memory may be performed during the resting period. Due to contention from other sources, chunks may execute faster or slower than anticipated, so delays are either increased or reduced (fine grain adjustments) to achieve the desired number of transactions within a sample period. In addition, chunks and delays can be arranged to spread transactions evenly across a sample period or can be concentrated in one place (burst) or even be configured to move the bursts to different locations within a sample period.

Although only thrasher, e.g., only one cache thrasher and only one main memory thrasher, may be illustrated herein, embodiments of the invention can include more than one thrasher, e.g. more than one cache thrasher and/or more than one main memory thrasher. For example, each of more than one thrasher may be used in conjunction with each of more than one bus monitor and each of more than one main memory port.

FIG. 1B illustrates a diagram of one embodiment illustrating bursts, resting periods, and sample periods 101. A sample period 182a, 182m comprises between 1 and N chunks 180a, 180n, where N is an integer greater than or equal to one. At least each chunk in a sample period is separated by a resting period 181a, 181n. Variable rate increase of main memory thrashing may be performed within one or across more than one sample period of a time window 183. Each time window comprises two or more sample periods. The sample period means a fixed period of time, where a time window comprises an integer or non-integer number of sample periods 182a, 182m. Fixed rate increase of main memory thrashing is performed across more than one-time window, and thus across sample periods of each time window. Note, the figures may not be to scale.

A constant rate and an uneven rate of reads of and/or writes to main memory 100E may have the same average rate over time, the uneven rate may, at least for some multicore processor systems, result in worst-case execution time of application(s) under test. This is because the application(s) under test may be more sensitive to the effects of contention for main memory at some points in time where it is performing more memory transactions than other times when it is performing fewer transactions.

Uneven distribution of interference of main memory can be implemented in at least two different ways: using fine grained adjustment and course grained adjustment. Fine grained adjustment and course grained adjustment can be used independently or in combination. Fine grained adjustment is performed within a sample period. Coarse grained adjustment is performed across two or more sample periods. Fine grained adjustment will first be illustrated. Fine grain adjustment means main memory accesses due to main memory thrashing and/or execution of the application(s) under test.

Figure 1C:
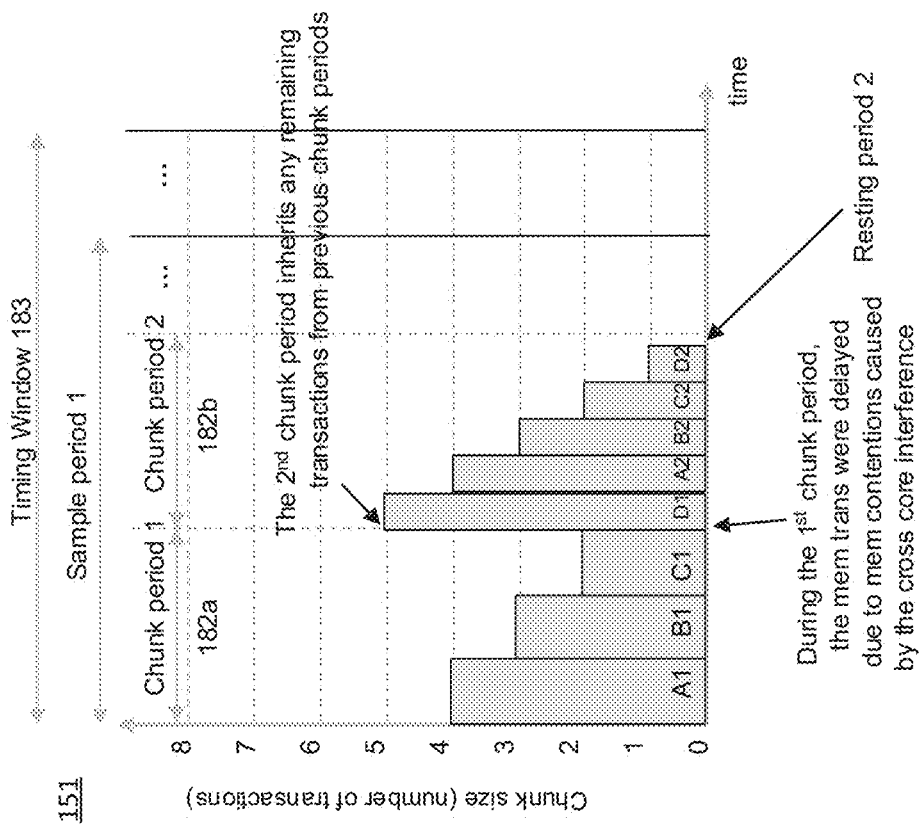
FIG. 1C illustrates a diagram of one embodiment of fine grained adjustment.

FIG. 1C illustrates a diagram of one embodiment of fine grained adjustment 151. A chunk period means a fixed period of time comprising one or more execution periods of a chunk, and optionally a resting period (Resting Period 2), where any resting period follows the execution period(s), and where a sample period comprises one or more chunk periods (chunk period 1 182a, chunk period 2 182b). The execution period(s) ([A1, B1, C1], [A2, B2, C2, D2]) are the portion of the chunk during which main memory thrashing is performed. Each execution period illustrated in FIG. 1C shows the corresponding remaining transactions to be executed. The amount of main memory thrashing (e.g., reading from and/or writing to main memory 110E) may vary amongst each execution period in a chunk period. The resting period (resting period 2) means the portion of the chunk period during which main memory thrashing is not performed. The resting period can be implemented, for example, by causing idling of the integrated thrashing system 100A.

In chunk period 1 182a, the goal was to complete four execution periods [A1, B1, C1, D1]. However, due to main memory interference, execution period D1 was neither started nor completed. Therefore, execution period D1 is initiated and completed in chunk period 2 182b prior to execution of four execution periods [A2, B2, C2, D2]. This exemplifies one embodiment of fine grain adjustment. The resting period in a chunk period is contingent upon all execution periods being completed before the end of the chunk period. Because execution period D1 was not completed, there is no resting period in chunk period 1 182a. Because execution periods [D1, A2, B2, C2, D2] are completed in chunk period 2 182b, there is a resting period 2 at the end of chunk period 2 182b (after the end of execution period D2 and the end of chunk period 2 182b).

The relative time of the execution period(s) and the corresponding resting period depends upon a number and/or density of main memory accesses (due to main memory thrashing, execution of the application(s) under test, and/or any other accesses of main memory) during the corresponding chunk period. Optionally, if main memory accesses (reads from and/or writes to main memory) are to be one hundred percent of the maximum main memory accesses which can be performed by the multicore processing and integrated thrashing system 100, then the resting period is zero; there is no resting period.

Fine grained adjustment may be performed by either using a spread or a walking burst. In the spread, a varying amount reads of and/or writes to main memory 100E, generated by main memory thrashing and/or processor cores, over time is provided during each execution period of each chunk period. A desired level of reads of and/or writes to main memory 100E may not be executed in a chunk period due to mapped memory interference, e.g., by the application(s) under test reading from or writing to mapped memory. To the extent that sufficient resting period(s) are available in succeeding chunk period(s) of the same sample period to perform the unexecuted reads and writes, the unexecuted reads of and/or writes to main memory 100E may be executed during succeeding chunk period(s) of the same sample period. However, if not all unexecuted reads of and/or writes can be executed by the end of the sample period, then a system flag is set or an error signal may be sent to indicate this, and the corresponding high level of memory interference. Optionally, the system flag is set or the error signal is sent by integrated thrashing system 100A and/or N processor cores 100B, and indicating that additional memory accesses remain to be completed). FIG. 1B illustrates a chunk period 1 182*a* which has no rest period because the main memory accesses took longer due to memory contentions caused by cross-core interference. In the event not all main memory accesses were executed during chunk period 1, remaining additional memory accesses may be completed during a subsequent chunk period (chunk period 2 182*b*).

Figure 1D:
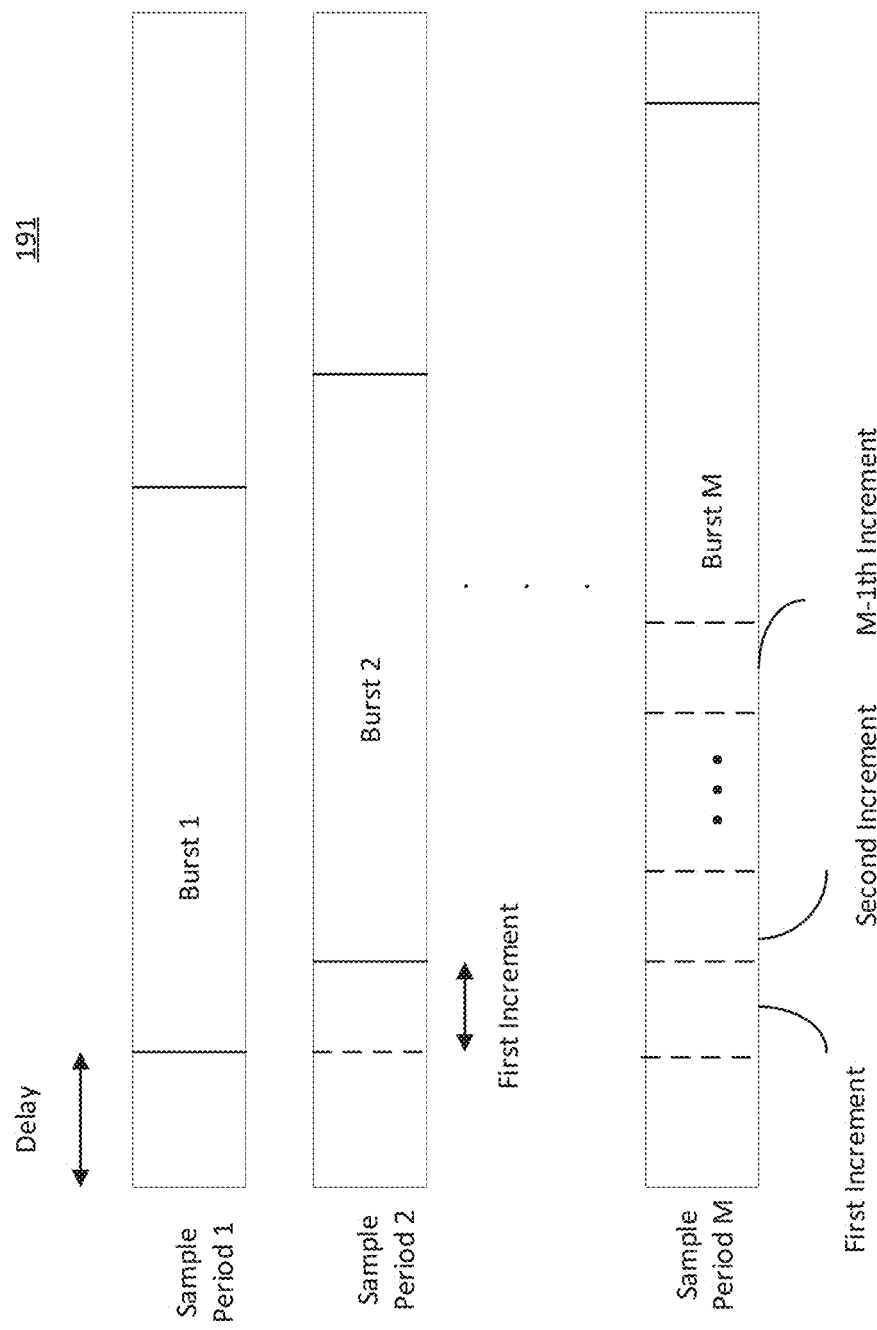
FIG. 1D illustrates a diagram of one embodiment of a walking burst.

FIG. 1D illustrates a diagram of one embodiment of a walking burst 191. In the walking burst, a constant amount of reads of and/or writes to main memory 100E, generated by a thrashing circuit, are performed during a single chunk (a burst, e.g., burst 1, burst 2, . . . , burst M) every sample period (e.g., sample period 1, sample period 2, . . . , sample period M) whose commencement is delayed by a period of delay from a starting time of a corresponding sample period; the fixed time period is shorter than the sample period and falls within the sample period. The delay may be greater than or equal to zero. The delay is incrementally increased by a fixed or variable amount or increment, e.g., first increment, second increment, . . . , M−1th increment, with each successive sample period. Hence the 'burst' of memory accesses 'walks' across the sample period over numerous sample periods.

Coarse grained adjustments are implemented over two or more sample periods, and not within a single sample period as is with fine grained adjustment. Coarse grained adjustments can be implemented with feedback and without feedback.

Coarse grained adjustments without feedback can be implemented at least two ways: (a) adding a fixed rate of main memory thrashing (e.g., additional reads from and/or writes to main memory, e.g., from main memory thrashing) during two or more sample periods of a single time window; and (b) adding a variable rate of main memory thrashing (e.g., additional reads from and/or writes to main memory, e.g., from main memory thrashing) varying during each of two or more chunk periods of each of two or more sample periods of a single time window.

FIG. 1E illustrates a diagram of one embodiment of adding a fixed rate of main memory thrashing for coarse grained adjustment 192. As the FIG. 1E illustrates, main memory access transactions (e.g., reads from and/or writes from main memory) from main memory thrashing add a fixed amount of main memory access transactions to, and thus track, the memory access transactions generated by processor core(s). Optionally, for the variable rates, the average of the rate during each chunk period and/or sample period would equal a desired target average rate.

Coarse grained adjustments with feedback would be implemented so that actual average reads from and/or writes to main memory resulting from the application(s) under test and a thrashing circuit would equal a desired target level, and is further described elsewhere herein. The desired targeted average may be the instantaneous average, or an average over each chunk period, each sample period, and/or each time window. FIG. 1F illustrates a diagram of one embodiment of using feedback to attain the desired target level 193.

Figure 2:
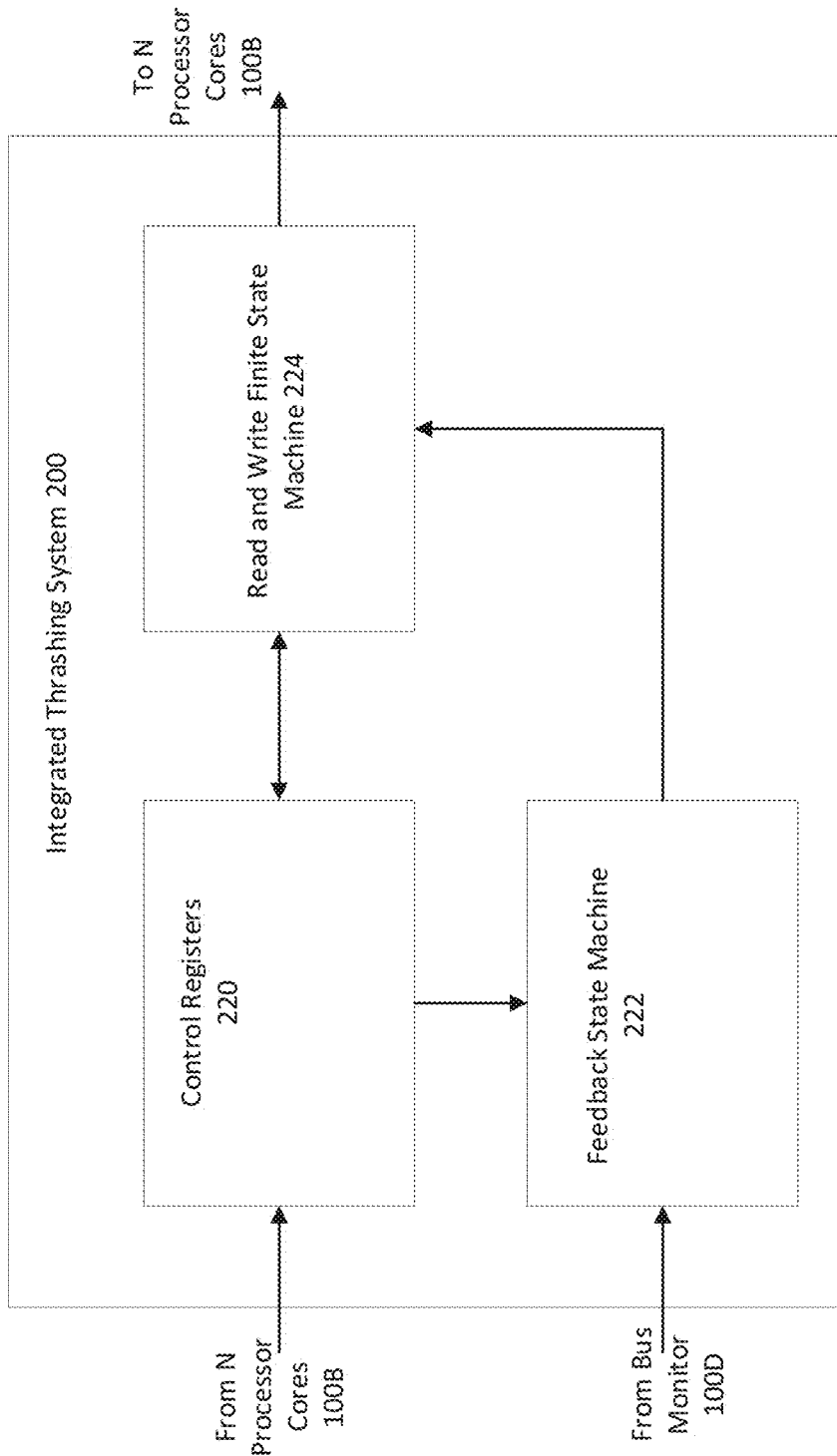
FIG. 2 illustrates a block diagram of one embodiment of an integrated thrashing system.

FIG. 2 illustrates a block diagram of one embodiment of an integrated thrashing system (or an integrated thrashing circuit) 200. The block diagram of FIG. 2 can illustrate a block diagram of one embodiment of a non-integrated thrashing system (or a non-integrated thrashing circuit) which is described elsewhere herein. One or more non-integrated thrashing circuits may be coupled to N processor cores.

The integrated thrashing system 200 comprises control registers 220 and a read and write finite state machine (or read and write finite state machine circuitry) 224. Optionally, the integrated thrashing system 200 includes a feedback state machine (or feedback state machine circuitry) 222 configured to facilitate variable rate increase of main memory thrashing. If no feedback is used, then the integrated thrashing system 200 provides a fixed rate of increased main memory thrashing.

The control registers are configured to receive, e.g., through the N processor cores 100B, configuration data from main memory 100E. The configuration data may be provided at startup of (e.g. upon initialization) of the multicore processor, and/or also subsequently during operation of the multicore processor. The configuration data means data that defines how the thrashing is to be performed by the integrated thrashing system 100A, e.g., whether fixed or variable rate increased main memory thrashing will be performed by the integrated thrashing system 100A, the rate of the fixed rate embodiment or the target average rate of the variable rate embodiment, the amount of read rates from and/or write rates to main memory, identification of bus monitors to be used for feedback technique, reading and/or writing patterns (e.g., five writes followed by three reads, sequential accesses vs. random, etc.), which mapped memory is to be thrashed (e.g. main memory and/or a bus for example a PCIe bus), and/or identification of portions of mapped memory to be read or to be written to. The read and write finite state machine 224 and the feedback state machine 222 read certain configuration data from the control registers 220 to allow and/or define how the read and write finite state machine 224 and the feedback state machine 222 perform their respective functions.

Sequential operation of shared cache thrashing and main memory thrashing is illustrated for pedagogical purposes. However, shared cache thrashing and main memory thrashing may be performed in parallel rather than sequentially.

During a first-time period, prior to execution of the application(s) under test, integrated thrashing system 200, e.g. through the read and write finite state machine 224, creates dirty data by writing data to shared portions of main memory 100E which correspond to shared portions of shared cache memory 100C. As a result, such dirty data is copied from the shared portions of main memory 100E to the corresponding shared portions of the shared cache memory 100C. Optionally, the shared portions of the main memory 100E (corresponding to the shared portions of shared cache memory 100C) are identified in the configuration data provided by the control registers. During a subsequent second time period, the application(s) under test is executed by one core of the N processor cores 100B, and another application is executed by another core of the N processor cores 100B.

During a second-time period, the integrated thrashing system 200, e.g., through the read and write finite state machine 224, generates fixed or variable rates of reads from and/or writes to main memory 100E as defined by the configuration data and/or to the extent the integrated thrashing system 200 includes, e.g., a feedback state machine 222. When providing a fixed rate of increased reads from and/or writes to main memory 100E, the integrated thrashing system 200, e.g., through the read and write finite state machine 224, generates main memory read requests and/or main memory write requests to achieve such a fixed increased rate. When providing a variable level of main memory thrashing, the integrated thrashing system 200:

(a) monitors, e.g., with a bus monitor 100D, a rate of at least one of reading to main memory and writing to main memory;

(b) determines, e.g., with the feedback state machine 222, whether the rate is less than a desired rate; and (c) if the rate is less than the desired rate, then increasing the rate of reading from and/or writing to main memory to a rate equal to the desired level, e.g., constant level. For example, the feedback state machine 222 determines that the rate is less than the desired rate, and determines a rate of reads from and/or writes to main memory 100E to be affected by the integrated thrashing system 200 to achieve the desired rate. The feedback state machine 222 then commands the read and write finite state machine 224 to affect the determined rate. The read and write finite state machine 224 then initiates reads from and/or writes to the main memory 100E to affect the determined rate. Commands for generating such reads and writes may be conveyed from read and write finite state machine 224 by the N processor cores 100B to the main memory 100E.

Alternatively, when the thrashing system is physically implemented external to the multicore processor, the thrashing system is configured to thrash portions, of only main memory (or memory and shared cache memory), used by the application(s) under test and at least one other application. Because this embodiment is not integrated in the multicore processor, this embodiment is referred to as the non-integrated thrashing system. The non-integrated thrashing system may be externally coupled to a multicore processor by implementing the thrashing system in a standalone FPGA, an application specific integrated circuit (ASIC), or a standalone processor core. The non-integrated thrashing system can also be implemented in software executed in a generic processing core, e.g., instantiated in the FPGA. The non-integrated thrashing system may be implemented like the integrated thrashing system 200 of FIG. 2, except that it may not include shared cache thrashing functionality as is further discussed elsewhere herein. Further, in some embodiments, even the integrated thrashing system may not include shared cache thrashing functionality and may utilize shared cache thrashing techniques described for the non-integrated cache thrashing system, e.g. software cache thrashers.

If the thrashing system is coupled only to main memory, then it is only configured to thrash main memory. However, for some multicore processors, e.g., Advanced RISC Machine (ARM) multicore processors, the shared cache memory may be externally accessible by a bus, e.g., a cache coherence bus; thus, a non-integrated thrashing system may also be able to thrash the shared cache memory through such a bus. Optionally, if the multicore processor's shared cache memory is not accessible to an external thrashing system, a software cache thrasher may be used to provide the shared cache thrashing functionality discussed elsewhere herein. The software cache thrasher may be executed on one or more cores of the multicore processor. For example, the software cache thrasher may be implemented on the same core used to execute the application(s) under test and may be executed before the application(s) under test to thrash L1 cache. Alternatively, the software cache thrasher may be executed on a core that is not used to execute the application(s) under test (or another application); in this case the software cache thrasher may be executed in parallel with the application(s) under test to thrash L2 and/or L3 cache.

Figure 3:
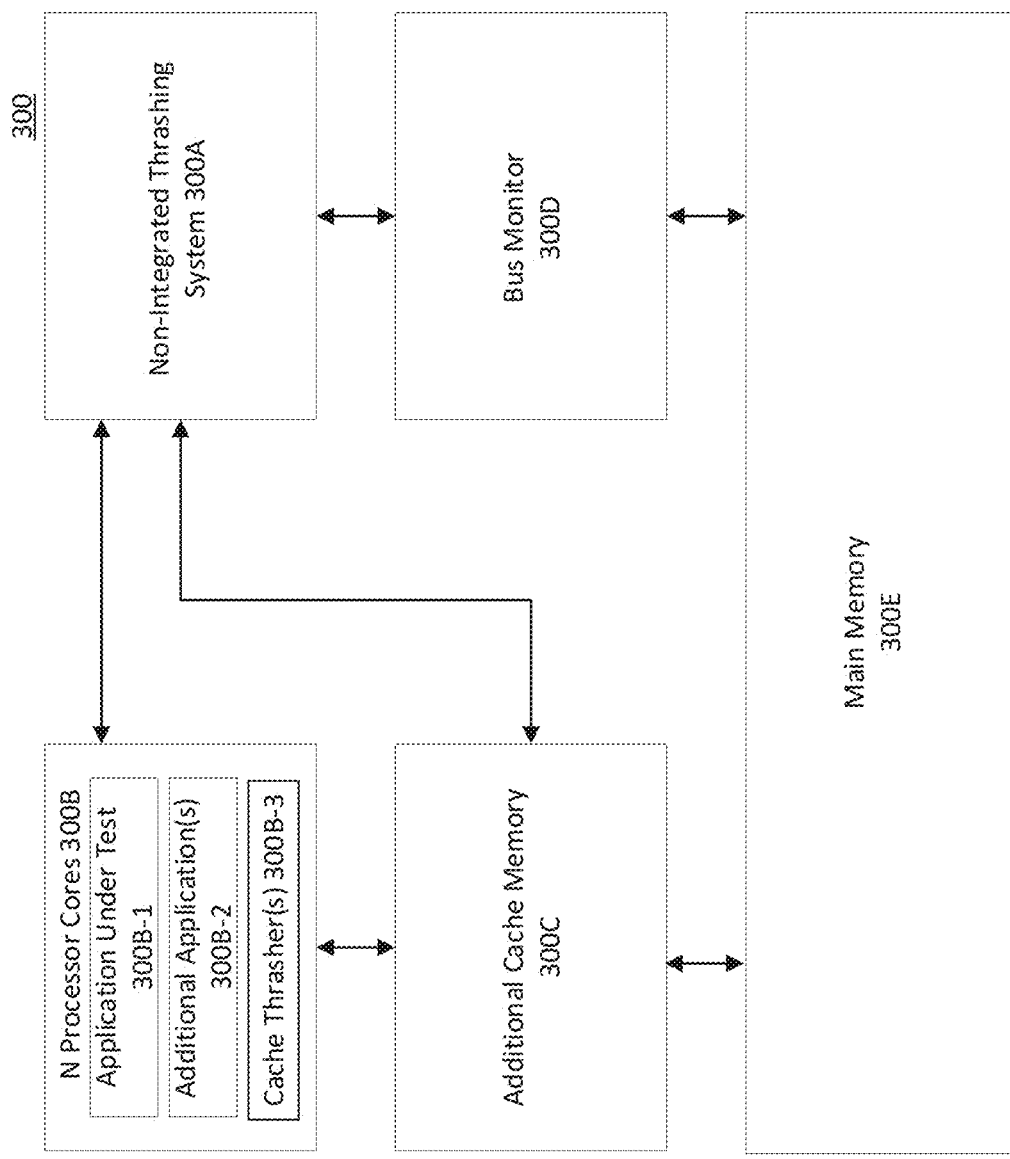
FIG. 3 illustrates a block diagram of one embodiment of a multicore processing system having a non-integrated thrashing system.

FIG. 3 illustrates a block diagram of one embodiment of a multicore processing system having a non-integrated thrashing system (multicore processing and non-integrated thrashing system) 300. The multicore processing and non-integrated thrashing system 300 performs main memory thrashing, and only optionally performs shared cache thrashing. The multicore processing and non-integrated thrashing system 300 includes a non-integrated thrashing system (or a non-integrated thrashing circuit) 300A, N processor cores (where N is greater than 1) 300B, shared cache memory 300C, a bus monitor (or bus monitor circuitry) 200D, and main memory 300E. The shared cache memory 300C and/or the bus monitor 300D may also be integrated, e.g., formed on a single integrated circuit, with the N processor cores 300B. The non-integrated thrashing system 300A means a thrashing system (or a thrashing circuit) that is not integrated with the N processor cores 300B. The N processor cores 300B are communicatively coupled to the non-integrated thrashing system 300A and the shared cache memory 300C. The shared cache memory 300C and the main memory 300E are communicatively coupled. The bus monitor 300D communicatively couples the non-integrated thrashing system 300A with the main memory 300E. Unique cores of the N processor cores 300B are configured to execute the application(s) under test 300B-1 and another application 300B-2. The application(s) under test 300B-1 and the other application 300B-2 may be stored in main memory 300E and/or the shared cache memory 300C.

Optionally, the non-integrated thrashing system 300A is coupled to the shared cache memory 300C directly or through the N processor cores 300B with a bus, e.g., a cache coherence bus, so that the non-integrated thrashing system 300A can thrash the shared cache memory 300C. If the non-integrated thrashing system 300A is not coupled to the shared cache memory 300C so that the non-integrated thrashing system 300A cannot thrash the shared cache memory 300C, then optionally, one or more shared cache thrashers 300B-3 are implemented in software and are executed on one or more cores of the N processor cores 200B. The software cache thrasher(s) 300B-3 may be stored in the shared cache memory 300C and/or the main memory 300E. Optionally, the multicore processing and non-integrated thrashing system 300 may be implemented with a non-integrated thrashing system having a structure similar to that of the integrated thrashing system 200, but which may (e.g. if a bus such as a cache coherence bus is available) or may not perform shared cache thrashing.

Figure 4:
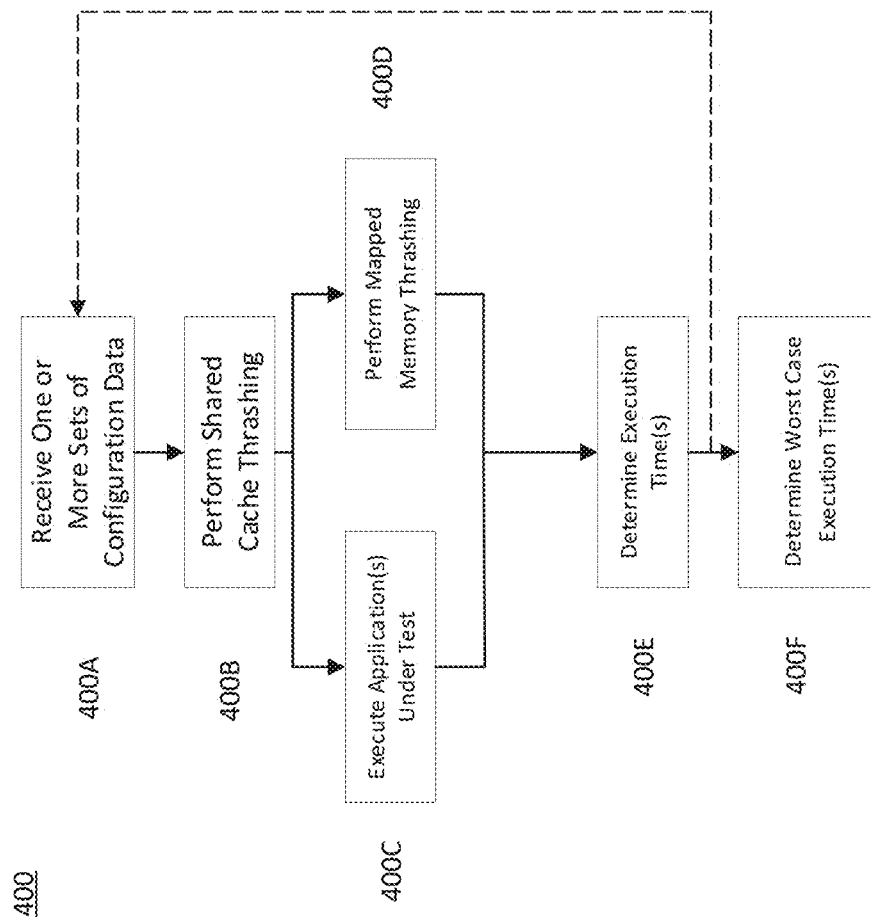
FIG. 4 is a flow diagram illustrating one embodiment of a method for determining worst-case execution time.

FIG. 4 is a flow diagram illustrating one embodiment of a method 400 for determining worst-case execution time. Method 400 may be implemented using the systems described in FIGS. 1-3, but may be implemented by other means as well. The blocks of the flow diagram have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 400A, receive one or more sets of configuration data, e.g., at the control registers 220 from an external processing system, data file, and/or any other source(s). One set of configuration data is provided for a unique thrashing circuit. In block 400B, optionally perform shared cache thrashing, e.g., with integrated thrashing system, a non-integrated thrashing system, and/or at least one software cache thrasher executed on one or more cores of the N processor cores 100B.

In block 400C execute the one or more applications under test, e.g. on one of the cores of the N processor cores 100B. In block 400D, perform mapped memory thrashing using one or more of the mapped memory thrashing techniques described herein; each mapped memory thrashing technique is performed on a unique thrashing circuit which may or may not be integrated. Optionally, blocks 400C and 400D are performed substantially contemporaneously, e.g., in parallel with one another. Optionally perform block 400D with the read and write finite state machine 224, and optionally the feedback state machine 222. Block 400D may be performed by one or more thrashing circuits, each having its own unique set of configuration data.

Optionally, mapped memory thrashing is performed in parallel with execution of the one or more applications under test. In a scenario where shared cache memory is shared across more than one core, then shared cache thrashing is performed contemporaneously with execution of the application(s) and optionally mapped memory thrashing. In a scenario where shared cache memory is shared by applications executed on a same core, then shared cache thrashing is performed prior to execution of the applications on the same core.

Further, optionally, if shared cache thrashing is performed, execution of the application(s) under test and any performance of the mapped memory thrashing are performed sequentially with the shared cache thrashing, e.g., with shared cache thrashing being performed prior to and concluded before execution of the application(s) under test and performance of mapped memory thrashing; such a sequence may be periodically performed during execution of method 400 to determine execution time.

In block 400E determine an execution time of each of the application(s) under test resulting from the mapped memory thrashing and/or cache thrashing performed in blocks 400B and/or 400D. Optionally, alternatively or additionally, determine an execution time of each process of each application under test, where an application under test may comprise one or more processes. An instance of mapped memory thrashing means implementing one strategy of mapped memory thrashing (e.g., a type of coarse and/or fine grained adjustments for affecting the application(s) under test) using a unique set of configuration data (e.g., defining mapped memory locations, with or without feedback, desired target average rate, etc.). Execution time means determination of a time for the application(s) under test to successfully complete execution subject to the mapped memory thrashing and/or shared cache thrashing. Optionally, the execution time is determined by the integrated thrashing system 100A, the non-integrated thrashing system 300A, or external processing circuitry.

Optionally, return to blocks 400A, 400B, or 400C at least once and also repeat bocks 400C, 400D, and 400E for the same mapped memory thrashing techniques using different parameter(s) (e.g., to achieve a different total rate of reads of and/or writes to main memory using variable rate increase, or to use a different fixed rate) or to use a different mapped memory thrashing techniques (with the same or different parameter). Return to block 400A if new configuration data is required every time different parameter(s) and/or a different mapped memory thrashing technique is used; if not, return to block 400B or block 400C depending upon whether optional shared cache thrashing is used. Thrashing techniques means the strategies described herein with respect to FIGS. 1B-1F.

In block 400F determine a worst-case execution time for at least one of: (a) the one or more applications under test, and (b) for each process of each of the one or more applications under test. The worst-case execution time for the application(s) under test is the maximum of the execution times, of the different instances of mapped memory thrashing performed. Optionally, the worst-case execution time is determined by the integrated thrashing system 100A, the non-integrated thrashing system 300A, or external processing circuitry.

The term processor, as used herein, generally refers to a computational device, which may also be a central processing unit (CPU) (e.g. an Intel Core Processor) or digital signal processor (DSP) (e.g. a Texas Instruments C series DSP), capable of accepting data and performing mathematical and logical operations as instructed by program instructions. CPUs and/or DSPs can also be implemented by field programmable gate arrays and/or application specific integrated circuits. A processing unit, whether a CPU, DSP, or core thereof, is implemented by electronic circuitry, and may also referred to herein as a processing circuit.

In one embodiment, where the multicore processing system includes multiple processing units, the multiple processing units may be part of a multi-CPU and/or DSP system, a set of cores in a multicore CPU or DSP, and/or a set of real and virtual CPU or DSP cores that perform hyper- or simultaneous multi-threading. Thus, for example, the multicore processing system may be a multi-CPU or DSP system, where the different CPUs or DSPs in the multi-CPU or DSP processing system have multiple cores.

Exemplary Embodiments

Example 1 includes a system for stimulating contention contributing to worst-case execution time of each of one or more applications under test, comprising: processor circuitry comprising N processor cores circuitry, where N is greater than or equal to one; wherein one or more of the N processor cores circuitry of the processor circuitry are configured to execute the one or more applications under test; one or more thrashing circuits communicatively coupled to the processor circuitry and configured to perform mapped memory thrashing to simulate the contention; shared cache memory circuitry communicatively coupled to the processor circuitry; and mapped memory circuitry communicatively coupled to the processor circuitry, the one or more thrashing circuits, and the shared cache memory circuitry.

Example 2 includes the system of Example 1, further comprising bus monitor circuitry communicatively coupled to mapped memory circuitry and configured to measure at least one of: rate of reading from the mapped memory circuitry and rate of writing to the mapped memory circuitry.

Example 3 includes the system of any of Examples 1-2, wherein the one or more thrashing circuits are further configured to perform shared cache thrashing, and the shared cache memory circuitry is communicatively coupled to the one or more thrashing circuits.

Example 4 includes the system of Example 3, wherein the shared cache thrashing thrashes only selected sets of data within shared cache memory by thrashing only memory addresses associated with the selected sets of data within the shared cache memory.

Example 5 includes the system of any of Examples 1-4, wherein at least one processor core of the N processor cores is configured to execute at least one software cache thrasher.

Example 6 includes the system of any of Examples 1-5, wherein when the one or more thrashing circuits are not integrated with the processor circuitry, then the one or more thrashing circuits are coupled to shared cache memory through a bus, and are configured to perform shared cache thrashing.

Example 7 includes the system of any of Examples 1-6, wherein at least one of the one or more thrashing circuits comprises: control register circuitry configured to receive configuration data; and read and write finite state machine circuitry coupled to the control register circuitry and configured, using the configuration data, to perform at least one of mapped memory thrashing and shared cache thrashing.

Example 8 includes the system of Example 7, the thrashing system further comprising feedback state machine circuitry.

Example 9 includes the system of any of Examples 1-8, wherein mapped memory thrashing comprises at least one of: fine grained adjustments using a spread, comprising varying over time an amount of at least one of: reads of mapped memory and writes to mapped memory during each execution period of each chunk period, where a time window comprises two or more sample periods, each sample period comprises two or more chunk periods, and each chunk period comprises one or more chunks; fine grained adjustments using a walking burst, comprising performing a constant amount, of at least one of reads of mapped memory and writes to mapped memory, during a fixed period of time every sample period whose commencement is delayed from a starting time of a corresponding sample period, where the fixed period is shorter than the sample period and falls within the sample period, the delay is greater than or equal to zero, the delay incrementally increases by a fixed or variable amount with each successive sample period, and where a time window comprises one or more sample periods; coarse grained adjustments without feedback comprising adding a fixed rate of additional at least one of reads from mapped memory and writes to mapped memory, during two or more sample periods, and where a time window comprises two or more sample periods; course grained adjustments without feedback comprising adding a variable rate of additional reads from and/or writes to mapped memory varying during each of two or more chunk periods of each of two or more sample periods of a single time window; and course grained adjustments using feedback comprising: monitoring a rate of at least one of: reading from the mapped memory and writing to the main memory; determining that the rate is less than a desired rate; and increasing the rate, of at least one of: reading from the mapped memory and writing to the mapped memory, to a rate equal to the desired level.

Example 10 includes the system of Example 9, wherein, for the fine grained adjustments using the spread, upon a desired level, of at least one of reads of mapped memory and writes to mapped memory, are not executed in a chunk period a due to memory interference, then executing the unexecuted reads of and/or writes to mapped memory during at least one subsequent chunk period of the same sample period.

Example 11 includes the system of any of Examples 9-10, wherein at least one chunk is followed by a resting period.

Example 12 includes a method, comprising: receiving one or more sets of configuration data, where each set is provided to a unique thrashing circuit; executing one or more applications under test on one or more processor cores circuitry of processor circuitry, where the processor circuitry comprises N processor cores circuitry, and where N is greater than or equal to one; performing mapped memory thrashing by one or more thrashing circuits; upon performing mapped memory thrashing, then determining an execution time for at least one of: (a) each of the one or more applications under test, and (b) for each process of each of the one or more applications under test; and determining worst-case execution time for at least one of: (a) the one or more applications under test, and (b) for each process of each of the one or more applications under test.

Example 13 includes the method of Example 12, further comprising performing shared cache thrashing.

Example 14 includes the method of Example 13, wherein the shared cache thrashing is performed by at least one of: (a) one or more thrashing circuits, and (b) at least one processor core of the N cores.

Example 15 includes the method of any of Examples 13-14, wherein the shared cache thrashing is performed and concluded prior to execution of the one or more applications under test and performance of mapped memory thrashing.

Example 16 includes the method of any of Examples 13-15, wherein the shared cache thrashing thrashes only selected sets of data within shared cache memory by thrashing only memory addresses associated with the selected sets of data within the shared cache memory.

Example 17 includes the method of any of Examples 12-16, wherein mapped memory thrashing comprises at least one of: fine grained adjustments using a spread, comprising varying over time an amount of at least one of: reads of mapped memory and writes to mapped memory during each execution period of each chunk period, where a time window comprises two or more sample periods, each sample period comprises two or more chunk periods, and each chunk period comprises one or more chunks; fine grained adjustments using a walking burst, comprising performing a constant amount, of at least one of reads of mapped memory and writes to mapped memory, during a fixed period of time every sample period whose commencement is delayed from a starting time of a corresponding sample period, where the fixed period is shorter than the sample period and falls within the sample period, the delay is greater than or equal to zero, the delay incrementally increases by a fixed or variable amount with each successive sample period, and where a time window comprises one or more sample periods; coarse grained adjustments without feedback comprising adding a fixed rate of additional at least one of reads from mapped memory and writes to mapped memory, during two or more sample periods, and where a time window comprises two or more sample periods; course grained adjustments without feedback comprising adding a variable rate of additional reads from and/or writes to mapped memory varying during each of two or more chunk periods of each of two or more sample periods of a single time window; and course grained adjustments using feedback comprising: monitoring a rate of at least one of: reading from the mapped memory and writing to the main memory; determining that the rate is less than a desired rate; and increasing the rate, of at least one of: reading from the mapped memory and writing to the mapped memory, to a rate equal to the desired level.

Example 18 includes the method of Example 17, wherein, for the fine grained adjustments using the spread, upon a desired level, of at least one of reads of mapped memory and writes to mapped memory, are not executed in a chunk period a due to memory interference, then executing the unexecuted reads of and/or writes to mapped memory during at least one subsequent chunk period of the same sample period.

Example 19 includes the method of any of Examples 17-18, wherein at least one chunk is followed by a resting period.

Example 20 includes a system for stimulating worst-case execution time of an application under test, comprising: multiprocessor circuitry comprising N processor cores circuitry, where N is greater than or equal to one; wherein one or more processor cores of the multiprocessor circuitry are configured to execute the application under test; thrashing circuitry coupled to the multiprocessor circuitry; shared cache memory circuitry coupled to the multiprocessor circuitry; main memory coupled to the shared cache memory circuitry; bus monitor circuitry coupled to main memory circuitry; wherein the thrashing circuitry is configured to: monitor a rate of at least one of: reading from the main memory and writing to the main memory; determining that the rate is less than a desired rate; and increasing the rate of reading from the main memory and/or writing to the main memory to a rate equal to the desired level.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for stimulating contention contributing to worst-case execution time of each of one or more applications under test, comprising:
   processor circuitry comprising N processor cores circuitry, where N is greater than or equal to one;
   wherein one or more of the N processor cores circuitry of the processor circuitry are configured to execute the one or more applications under test;
   one or more thrashing circuits communicatively coupled to the processor circuitry and configured to perform mapped memory thrashing to simulate the contention;
   shared cache memory circuitry communicatively coupled to the processor circuitry; and
   mapped memory circuitry communicatively coupled to the processor circuitry, the one or more thrashing circuits, and the shared cache memory circuitry.

2. The system of claim 1, further comprising bus monitor circuitry communicatively coupled to mapped memory circuitry and configured to measure at least one of: rate of reading from the mapped memory circuitry and rate of writing to the mapped memory circuitry.

3. The system of claim 1, wherein the one or more thrashing circuits are further configured to perform shared cache thrashing, and the shared cache memory circuitry is communicatively coupled to the one or more thrashing circuits.

4. The system of claim 3, wherein the shared cache thrashing thrashes only selected sets of data within shared cache memory by thrashing only memory addresses associated with the selected sets of data within the shared cache memory.

5. The system of claim 1, wherein at least one processor core of the N processor cores is configured to execute at least one software cache thrasher.

6. The system of claim 1, wherein when the one or more thrashing circuits are not integrated with the processor circuitry, then the one or more thrashing circuits are coupled to shared cache memory through a bus, and are configured to perform shared cache thrashing.

7. The system of claim 1, wherein at least one of the one or more thrashing circuits comprises:
   control register circuitry configured to receive configuration data; and
   read and write finite state machine circuitry coupled to the control register circuitry and configured, using the configuration data, to perform at least one of mapped memory thrashing and shared cache thrashing.

8. The system of claim 7, the thrashing system further comprising feedback state machine circuitry.

9. The system of claim 1, wherein mapped memory thrashing comprises at least one of:
   (a) fine grained adjustments using a spread, comprising varying over time an amount of at least one of: reads of mapped memory and writes to mapped memory during each execution period of each chunk period, where a time window comprises two or more sample periods, each sample period comprises two or more chunk periods, and each chunk period comprises one or more chunks;
   (b) fine grained adjustments using a walking burst, comprising performing a constant amount, of at least one of reads of mapped memory and writes to mapped memory, during a fixed period of time every sample period whose commencement is delayed from a starting time of a corresponding sample period, where the fixed period is shorter than the sample period and falls within the sample period, the delay is greater than or equal to zero, the delay incrementally increases by a fixed or variable amount with each successive sample period, and where a time window comprises one or more sample periods;
   (c) coarse grained adjustments without feedback comprising adding a fixed rate of additional at least one of reads from mapped memory and writes to mapped memory, during two or more sample periods, and where a time window comprises two or more sample periods;
   (d) course grained adjustments without feedback comprising adding a variable rate of additional reads from and/or writes to mapped memory varying during each of two or more chunk periods of each of two or more sample periods of a single time window; and
   (e) course grained adjustments using feedback comprising:
      (i) monitoring a rate of at least one of: reading from the mapped memory and writing to the main memory;
      (ii) determining that the rate is less than a desired rate; and
      (iii) increasing the rate, of at least one of: reading from the mapped memory and writing to the mapped memory, to a rate equal to the desired level.

10. The system of claim 9, wherein, for the fine grained adjustments using the spread, upon a desired level, of at least one of reads of mapped memory and writes to mapped memory, are not executed in a chunk period a due to memory interference, then executing the unexecuted reads of and/or writes to mapped memory during at least one subsequent chunk period of the same sample period.

11. The system of claim 9, wherein at least one chunk is followed by a resting period.

12. A method, comprising:
   receiving one or more sets of configuration data, where each set is provided to a unique thrashing circuit;
   executing one or more applications under test on one or more processor cores circuitry of processor circuitry, where the processor circuitry comprises N processor cores circuitry, and where N is greater than or equal to one;
   performing mapped memory thrashing by one or more thrashing circuits;

upon performing mapped memory thrashing, then determining an execution time for at least one of: (a) each of the one or more applications under test, and (b) for each process of each of the one or more applications under test; and determining worst-case execution time for at least one of: (a) the one or more applications under test, and (b) for each process of each of the one or more applications under test.

13. The method of claim 12, further comprising performing shared cache thrashing.

14. The method of claim 13, wherein the shared cache thrashing is performed by at least one of: (a) one or more thrashing circuits, and (b) at least one processor core of the N cores.

15. The method of claim 13, wherein the shared cache thrashing is performed and concluded prior to execution of the one or more applications under test and performance of mapped memory thrashing.

16. The method of claim 13, wherein the shared cache thrashing thrashes only selected sets of data within shared cache memory by thrashing only memory addresses associated with the selected sets of data within the shared cache memory.

17. The method of claim 12, wherein mapped memory thrashing comprises at least one of:
  (a) fine grained adjustments using a spread, comprising varying over time an amount of at least one of: reads of mapped memory and writes to mapped memory during each execution period of each chunk period, where a time window comprises two or more sample periods, each sample period comprises two or more chunk periods, and each chunk period comprises one or more chunks;
  (b) fine grained adjustments using a walking burst, comprising performing a constant amount, of at least one of reads of mapped memory and writes to mapped memory, during a fixed period of time every sample period whose commencement is delayed from a starting time of a corresponding sample period, where the fixed period is shorter than the sample period and falls within the sample period, the delay is greater than or equal to zero, the delay incrementally increases by a fixed or variable amount with each successive sample period, and where a time window comprises one or more sample periods;
  (c) coarse grained adjustments without feedback comprising adding a fixed rate of additional at least one of reads from mapped memory and writes to mapped memory, during two or more sample periods, and where a time window comprises two or more sample periods;
  (d) course grained adjustments without feedback comprising adding a variable rate of additional reads from and/or writes to mapped memory varying during each of two or more chunk periods of each of two or more sample periods of a single time window; and
  (e) course grained adjustments using feedback comprising:
    (iv) monitoring a rate of at least one of: reading from the mapped memory and writing to the main memory;
    (v) determining that the rate is less than a desired rate; and
    (vi) increasing the rate, of at least one of: reading from the mapped memory and writing to the mapped memory, to a rate equal to the desired level.

18. The method of claim 17, wherein, for the fine grained adjustments using the spread, upon a desired level, of at least one of reads of mapped memory and writes to mapped memory, are not executed in a chunk period a due to memory interference, then executing the unexecuted reads of and/or writes to mapped memory during at least one subsequent chunk period of the same sample period.

19. The method of claim 17, wherein at least one chunk is followed by a resting period.

20. A system for stimulating worst-case execution time of an application under test, comprising:
  multiprocessor circuitry comprising N processor cores circuitry, where N is greater than or equal to one;
  wherein one or more processor cores of the multiprocessor circuitry are configured to execute the application under test;
  thrashing circuitry coupled to the multiprocessor circuitry;
  shared cache memory circuitry coupled to the multiprocessor circuitry;
  main memory coupled to the shared cache memory circuitry;
  bus monitor circuitry coupled to main memory circuitry;
  wherein the thrashing circuitry is configured to:
    monitor a rate of at least one of: reading from the main memory and writing to the main memory;
    determining that the rate is less than a desired rate; and
    increasing the rate of reading from the main memory and/or writing to the main memory to a rate equal to the desired level.

* * * * *